May 8, 1962   G. E. KELLOGG   3,033,578
FLUID SEAL
Filed Aug. 10, 1959
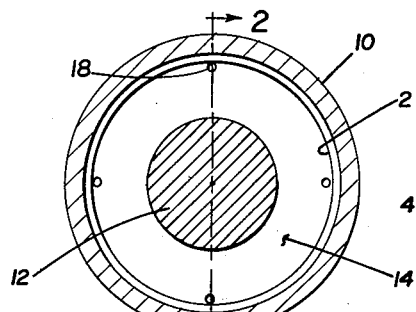
FIG. 1
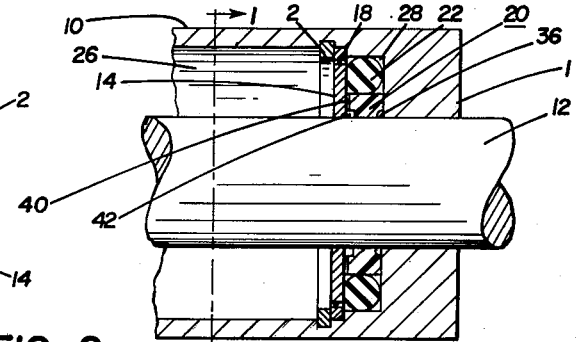
FIG. 2
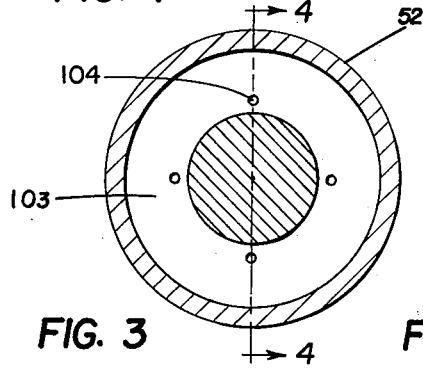
FIG. 3
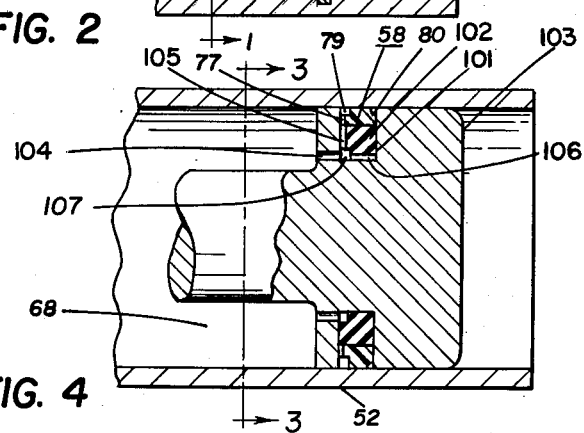
FIG. 4
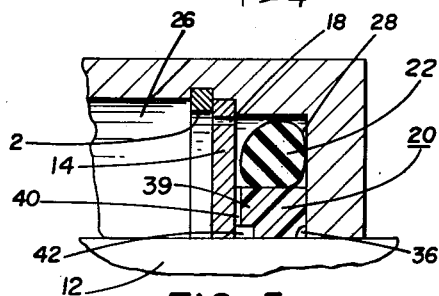
FIG. 5
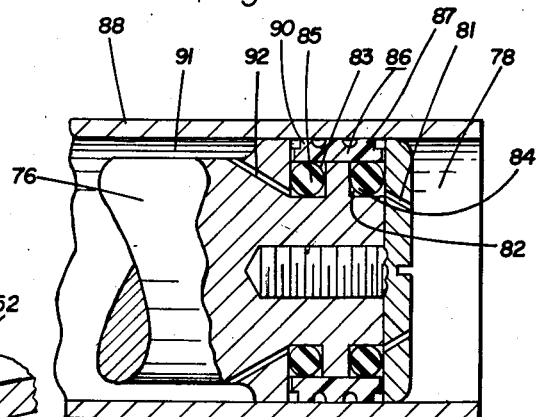
FIG. 6
FIG. 7
INVENTOR.
GEORGE E. KELLOGG
BY
ATTORNEY

3,033,578
FLUID SEAL

George E. Kellogg, Miamisburg, Ohio, assignor to General Motors Corporation, Detroit, Mich., a corporation of Delaware
Filed Aug. 10, 1959, Ser. No. 832,554
2 Claims. (Cl. 277—78)

This invention relates to a fluid seal and more particularly to a fluid seal which contacts the sealed surface with a changing pressure responsive to the pressure of the fluid being sealed.

The reduction of seal friction is a problem, particularly where a high pressure fluid is to be sealed. Accordingly, this invention is to overcome a considerable part of the inefficiency of a mechanism caused by seal friction. The seal pressure is controlled and is relative to the fluid pressure of the fluid being sealed. The seal is also constructed of a material having a low coefficient of friction which also increases the efficiency of the device.

It is an object of the invention to provide a fluid seal for use in connection with members movable relative to each other wherein the seal is held within a groove, or recess, of one member with a portion of the seal engageable with the other member under a force proportional to a pressure head applied differentially against the seal.

It is a further object to provide a fluid seal of the radial type wherein minimum leakage and frictional wear occur between members movable relative to each other in connection with the seal. The seal including multiple portions is disposed within a recess structure of one member and achieves proportional sealing action in response to fluid pressure differential forces applied on the internal and external sides of the seal.

Another object of the invention is to provide a fluid seal of the radial type providing sealing forces proportional to fluid pressure applied between relatively movable members by pressure forces directed upon adjacent sides of a part of the seal which is a semi-fluid material and opposite sides of a semi-rigid part. The semi-fluid part being deformable under pressure transmitting a resultant force to a sealing ring part formed of tough and wear-resistant semi-rigid material having excellent bearing properties with relatively low coefficient of friction.

A further object of the invention is to provide a radial fluid pressure seal for use between relatively movable members utilizing hydraulic pressure balance on the seal to regulate friction between the seal and one of the members.

A further object of the invention is to utilize a deformable ring portion of a fluid seal mounted between members movable relative to each other for transmitting a resultant force of a pressure applied through the deformable ring portion to a separate sealing ring portion of the seal effecting minimum leakage of fluid by a sealing ring wherein the separate sealing ring portion is preferably made of a tough and wear-resistant synthetic material having excellent bearing properties with relatively low coefficient of friction, such as Teflon, nylon, silicon resins, and the like.

The objects of this invention are accomplished by means of providing a member having a groove for reception of the seal. The seal contacts a member movable relative to the first member containing the seal groove. The seal ring is constructed of a semi-rigid material having a low coefficient of friction. A deformable ring is also placed within the groove contacting the seal and also contacting the bottom of the seal groove. The portion of the groove containing the deformable ring is vented to the fluid being sealed. This permits the pressure of the fluid being sealed to enter the sealed groove and deform the ring which is constructed of a deformable material. The deformable ring then creates a pressure on the semi-rigid seal thereby causing a force for sealing of the fluid which is directly proportional to the pressure of the fluid being sealed. The deformable ring may be of circular or rectangular cross section as shown or any suitable cross section desired.

Further objects and advantages of the present invention will be apparent from the following description, reference being had to the accompanying drawings wherein a preferred embodiment of the present invention is clearly shown.

In the drawings:

FIGURE 1 is a cross-section view taken on line 1—1 of FIGURE 2.

FIGURE 2 is a cross-section view taken on line 2—2 of FIGURE 1. This view shows the seal groove in the radially outer member sealing the surface on a radially inner member.

FIGURE 3 is a cross-section view taken on line 3—3 of FIGURE 4.

FIGURE 4 is a cross-section view taken on line 4—4 of FIGURE 3. FIGURES 3 and 4 illustrate a piston having an annular groove for reception of the fluid seal operating within a cylinder.

FIGURE 5 is a cross-section view wherein the central member contains the seal groove and the deformable O-ring is shown in a deformed position.

FIGURE 6 illustrates a piston having a double O-ring groove and a double seal mounted within a piston. This structure illustrates a seal for operation regardless of direction of movement of the piston.

FIGURE 7 is a three-dimensional view showing the O-ring and the seal ring in a piston. The venting of the O-ring and seal ring is shown more clearly by the cutaway portions in the view.

FIGURE 1 illustrates the end cross-section view whereby the internal member is sealed and the cylinder member retains the seal. The cylinder 10 contains a radial wall 1 which forms one side of the annular groove 28. The opposite side of the annular groove is formed by a retainer plate 14. This plate 14 is maintained in its position by a snap ring 2. The internal member 12 slides axially within the cylinder 10. The seal groove 28 receives the O-ring 22 and the seal ring 20. The annular groove 28 is vented by a plurality of vents 18. The vents 18 place the annular groove 28 in communication with the chamber 26. The chamber 26 contains the fluid which is to be sealed. The O-ring 22 is radially outward in the groove 28 and contacts the seal 20. The seal 20 is recessed by means of an optional annular groove 36 on its forward side and the annular groove 42 required on its rearward side. The annular groove 42 is vented by the optional radial opening 40 to the radially outer portion of the annular groove.

The ring seal 20 is preferably formed of Teflon containing glass fibers and graphite to produce a less deformable material having less tendencies to cold flow and a low coefficient of friction. The applicant, however, does not wish to limit the composition of the ring seal to this material.

FIGURES 3 and 4 illustrate a similar seal wherein the seal is contained within the internal member or piston 103. The piston 103 has a groove 101 in its outer periphery. The annular groove 101 is vented by means of the vents 104 angularly spaced in the piston 103. The vents 104 place the chamber 68, which contains the fluid to be sealed, in communication with the annular groove 101. The bottom of the groove 101 contains the rectangular ring 102 having radial passages 105 on the rearward side and axial passages 106 on the radially inward side connected to an annular recess 107. The rectangular ring 102 is in constant contact with the seal ring 58. The seal ring 58 is recessed by the optional annular groove 80 on its forward side and the required annular groove 79 on its rearward side. The seal member 58 also maintains optional radial vents 77 which place the annular groove 79 in communication with the radially inner portion of the groove 101. The seal illustrated in FIGURES 3 and 4 operates in a similar manner as the seal illustrated in FIGURES 1 and 2 except the rectangular ring expands the seal 58 against the inner periphery of the cylinder 52. The seal illustrated in FIGURES 1 and 2 contacts the O-ring against the seal member 20 to seal the rod 12 within the cylinder 10.

The retainer plate 72 and snap ring 73 is eliminated by employing a solid piston as shown in FIGURES 3 and 4. Either an O or rectangular cross sectioned ring may be used under the seal ring.

FIGURE 5 illustrates the sealing action of the seal illustrated in FIGURES 1 and 2. The vent 18 permits the fluid from the fluid chamber 26 to enter within the sealing groove 28. As the fluid pressure enters the vent 18, the O-ring 22 which is constructed of a deformable material is deformed in a manner as shown. The force of the fluid on the O-ring creates a radially inward force contracting the seal member 20. The fluid is permitted to pass through the vent 40 or clearance between shaft 12 and plate 14 thereby creating an equalizing pressure on both sides of the axially extending flange 39 of seal 20. The optional annular groove 36 relieves the seal 20 on the other corner of the radially inner section to allow for seal 20 to be placed on the shaft in either direction. The intermediate portion on the radially inner section of seal 20 receives the resultant force from O-ring 22. The radially inner force on the semi-rigid seal 20 is in direct proportion to the fluid in the chamber 26 which is sealed under this action.

FIGURE 6 is an illustration whereby the sealing arrangement may be employed to seal a fluid in a chamber fore and aft of the piston 76. The fluid in the chamber 78, forward of the seal, is permitted to enter through the vent 81. The piston 76 is provided with a double annular groove 82 and 83. The groove 82 contains an O-ring 84. The groove 83 contains the O-ring 85. The seal 86 may extend axially to cover the O-ring 85 and also the O-ring 84. As the pressurized fluid enters the forward annular groove 82, the O-ring 84 is deformed, thereby compressing the annular ridge 87 of seal 86 about the inner periphery of the cylinder 88. This causes the sealing action in the forward movement of the piston 76.

The rearward portion of the seal 86 is also provided with an annular ridge 90 which is compressed against the inner periphery of the cylinder 88 as the pressure from the chamber 91 enters the vent 92. The action of the O-ring 85 and the groove 83 is similar to the action of the O-ring 84 in the forward groove 82. This seal provides a single annular seal which may be operated in cooperation with two O-rings to provide sealing directly proportionate to the fluid in the chambers fore and aft of the piston 76.

FIGURE 7 is a three-dimensional view of the seal similar to the seal illustrated in FIGURES 3 and 4 except an O-ring 62 replaces the rectangular ring 102. The cylinder 52 is mounted concentrically around the piston 54. The piston 54 contains an annular groove 70 which is vented by axially extending vents 66. The vents 66 permit the fluid to enter from the chamber 68 rearward of the piston 54. The fluid enters the annular groove 70 and is vented radially outward through the optional vents 77 or the clearance between cylinder 52 and plate 72. The action in this seal is similar to that as described in FIGURE 5 except the O-ring 62 expands the seal 58 radially outward against the inner periphery of the cylinder 52.

The operation of the seal functions in the following manner. The seal in the single or double seal arrangement operates individually the same for the chamber which is being sealed. For this reason, the description of the operation will be for a single seal sealing a chamber on one side of the piston. FIGURE 7 illustrates the seal which operates on the inner periphery of the cylinder 52. The piston 54 is provided with an annular groove for reception of the O-ring 62 and the ring seal 58. The use of snap ring 73, and plate 72 are required only when seal 58 will not stretch over shaft 54 and into groove 70. The O-ring 62 is mounted in the bottom of the groove 70 which is formed on its forward side by the wall 55 of piston 54. The rearward wall shown is formed by the retainer plate 72 which is maintained in its position by a snap ring 73. The O-ring 62 is seated in the groove 70 and contacts the inner periphery of the seal 58. The pressure from the chamber 68 enters the vent 66 to the groove 70. This pressure creates a deformation of the O-ring 62 in the same manner as illustrated in FIGURE 5. The O-ring creates a radially outward force against the seal 58. The O-ring also deforms to permit seepage of fluid along the rearward wall of the groove 70 and radially through the optional vents 77. An equalizing pressure on the radially inward and radially outward portion of the required rearwardly extending flange 61 is created. The seal 58 is also relieved on its forward side by the optional annular groove 80. Consequently, the main force of the fluid pressure in the bottom of the annular groove 70 is a thrust radially outward on the seal 58 where it contacts the inner periphery of the cylinder 52. A controlled pressure is created between the seal and the cylinder causing a positive seal between the piston and the cylinder. The material forming the seal 58 is a semi-rigid material having low coefficient of friction and controlled radial force therefore causes a minimum of friction as the piston 54 moves within cylinder 52.

It will be noted that the pressure of the seal on the inner periphery of the cylinder 52 is directly proportional to the pressure within the chamber 68. It is for this reason that the seal operates at a high rate of efficiency as the coefficent of friction is at a minimum and radial force on the seal is not in excess of that required to seal the entrapped fluid. As the pressure in the fluid chamber 68 is decreased, the contact thrust of the inner periphery of the cylinder 52 is correspondingly decreased and the drag caused by the seal is also correspondingly reduced.

While the embodiments of the present invention as herein disclosed constitute preferred forms, it is to be understood that other forms might be adopted.

What is claimed is as follows:

1. A fluid seal insertable between concentric cylindrical surfaces, comprising, a cylindrical sealing element having a body portion placed in a groove formed between the surfaces, a notched flange portion extending longitudinally from said body portion in opposite directions, a plurality of annular ridges formed by annular grooves on the sealing surface of said sealing element, and a separate load-transmitting means subject to separate pressure heads on longitudinally opposite ends of said element, each load-transmitting means being axially aligned with said ridges and radially associated with said element in the groove to regulate individual friction engagement of said sealing element body portion adjacent each flange portion in proportion with each pressure head.

2. In a seal of the character described comprising in combination; a movable member having an annular groove for reception of a seal means, a second member being stationary relative to said movable member, said movable member having a groove for reception of a semi-rigid annular seal member contacting said stationary member, an annular recess on the leading and trailing edge of the surface of said seal member contacting said stationary member, a deformable member contained within said groove and radially contacting said semi-rigid member and said movable member, venting means from a chamber between said movable member and said stationary member to the lower portion of said groove to provide fluid pressure within the lower portion of said annular groove thereby deforming said deformable member creating a radial thrust against said seal member proportional to the fluid pressure within said chamber being sealed.

References Cited in the file of this patent

UNITED STATES PATENTS

| | | |
|---|---|---|
| 1,385,613 | Gill | July 26, 1921 |
| 1,972,809 | Watson et al. | Sept. 4, 1934 |
| 2,825,590 | Sutherland | Mar. 4, 1958 |
| 2,892,645 | Tydeman | June 30, 1959 |